March 30, 1965  D. S. HORNE ETAL  3,175,425
DRIVE ASSEMBLY FOR SELF-PROPELLED COMBINE
Original Filed July 6, 1960
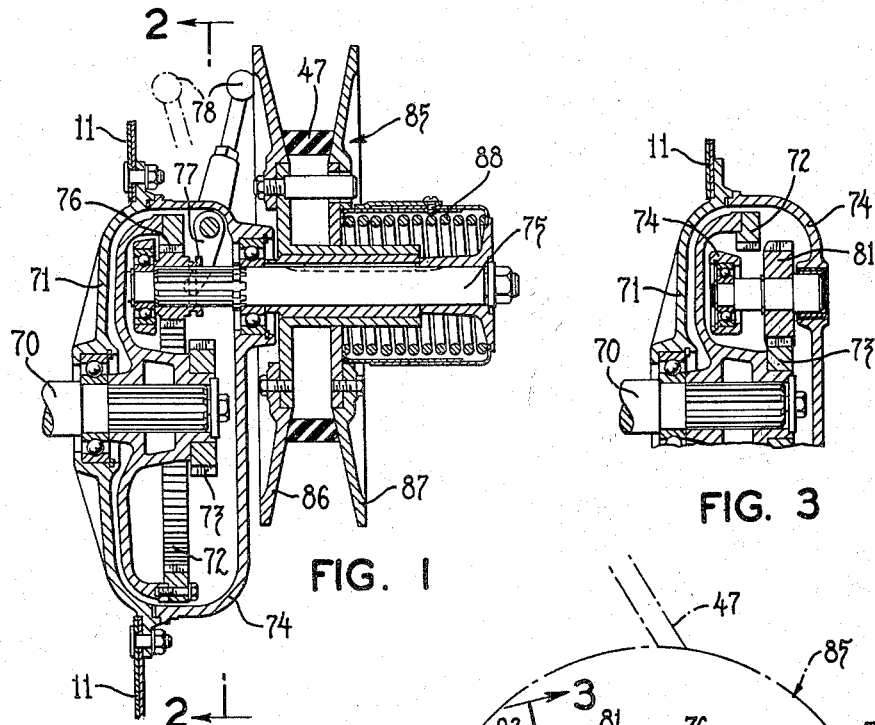
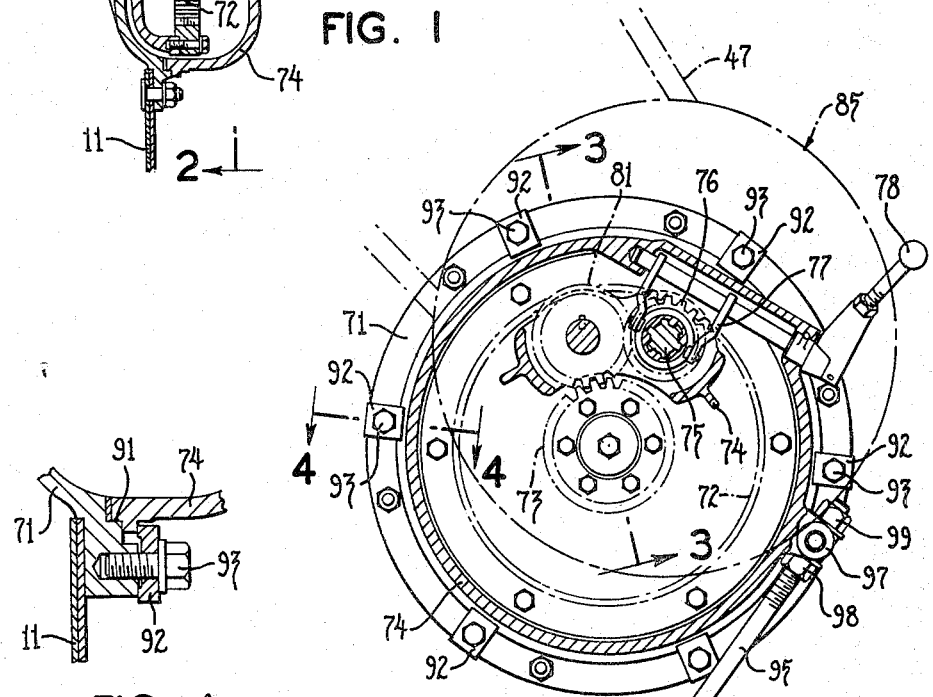
INVENTORS.
DONALD S. HORNE,
ROBERT ASHTON &
LESLIE L. KEPKAY
BY
*Wolfe, Hubbard, Voit & Osann*
ATTORNEYS.

United States Patent Office 3,175,425
Patented Mar. 30, 1965

3,175,425
DRIVE ASSEMBLY FOR SELF-PROPELLED COMBINE
Donald S. Horne, Robert Ashton, and Leslie L. Kepkay, all of Toronto, Ontario, Canada, assignors to Massey-Ferguson Limited, Toronto, Ontario, Canada, a corporation of Canada
Original application July 6, 1960, Ser. No. 41,154, now Patent No. 3,049,026, dated Aug. 14, 1962. Divided and this application Nov. 24, 1961, Ser. No. 160,389
2 Claims. (Cl. 74—745)

This invention relates generally to agricultural harvesting machines of the self-propelled combine type and concerns, more particularly, the power distributing and controlling mechanisms for such machines.

This application is a division of our copending application Serial No. 41,154, filed July 6, 1960, and now Patent No. 3,049,026.

In applicant's co-pending application, Serial No. 744,156, filed June 24, 1958, now Patent No. 2,999,347, a novel self-propelled combine is disclosed in which the engine that is the main power plant is mounted at the top of the combine along a fore and aft axis. The main drive shaft of the combine extends transversely of the combine frame behind the engine so that the engine and the main drive shaft define a T-shaped assembly which is utilized to power the various combine mechanisms.

It is the primary aim of the present invention to provide an improved combine driving assembly of the above described novel T-shaped configuration.

Another object of the invention is to provide a novel combine driving assembly of the type referred to above which is exceptionally compact in that substantially all of the major power driven subassemblies are powered from and controlled at the main drive shaft immediately adjacent the engine. A collateral object is to provide such a driving assembly in which most of the power controlling mechanisms such as friction clutches and variable speed pulleys are centrally located in a manner to facilitate combine operation and simplify adjustment and maintenance problems.

In one of its aspects it is an object of the invention to provide a simplified high-low range, infinite speed drive for a combine component that is especially suitable for supplying power to the combine threshing cylinder. It is a related object to provide such a component drive which is economical to manufacture and simple to adjust and maintain.

Other objects and advantages of the invention will become apparent upon reading the following detailed description and upon reference to the drawings in which:

FIG. 1 is a fragmentary section showing a portion of a combine drive embodying the present invention;

FIG. 2 is a section taken approximately along the line 2—2 in FIG. 1; and

FIGS. 3 and 4 are fragmentary sections taken approximately along the lines 3—3 and 4—4 respectively in FIG. 2.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

The initial objects of the invention are achieved by the construction and arrangement fully described in our above identified Patent No. 3,049,026. As shown in that patent, the invention is embodied in a combine in which the engine is mounted longitudinally of the combine frame 11 and is coupled to a transversely extending drive shaft. The drive shaft is clutched to a variable diameter drive pulley which, through a belt 47, supplies power to a threshing cylinder mounted in the combine frame.

In accordance with a further aspect of the invention, a simplified high-low range, infinite speed drive is coupled to the main drive shaft so as to economically provide exact speed control for the threshing cylinder of the combine. In the preferred embodiment, the cylinder is carried by a shaft 70 journalled at one end in a wall portion 71 secured to and forming a part of the side wall of the combine frame 11 (see FIG. 1).

To provide an alternately usable high and low range coupling for driving the cylinder shaft 70, the outer end of the shaft carries both an internal ring gear 72 and a pinion gear 73. The gears 72, 73 are disposed in spaced planes and have significantly different pitch diameters so as to provide the desired differentiation between high and low range cylinder drive.

Surrounding the end of the cylinder shaft 70 and enclosing the gears 72, 73 in a housing 74 mounted on the wall portion 71. The housing 74 journals a stub shaft 75 so that the stub shaft is disposed parallel to, but spaced from, the axis of the cylinder shaft 70. Splined on that portion of the stub shaft 75 within the housing 74 is an axially shiftable pinion 76 which may be slid on the stub shaft into either one of two positions by a shifter fork 77 controlled by a handle 78.

With the handle 78 in the solid line position shown in FIG. 1, the axially shiftable pinion 76 is moved to its first position where it is in meshing engagement with the internal ring gear 72. This establishes a step down drive ratio from the stub shaft 75 to the cylinder shaft 70. With the handle 78 in its alternate dashed line position shown in FIG. 1, the axially shiftable pinion 76 is moved to the right in this figure so as to establish a more nearly direct drive between the stub shaft 75 and the cylinder shaft 70. To establish this drive, the axially shiftable pinion 76 moves into engagement with an idler gear 81 which is journalled in the housing 74 in meshing engagement with the cylinder shaft pinion gear 73.

The purpose of interposing the idler gear 81 is, of course, to establish the same direction of rotation for the cylinder shaft 70 whether or not the drive from the axially shiftable pinion 76 is through the ring gear 72 or the cylinder shaft pinion gear 73.

While the axially shiftable pinion 76 under the control of the handle 78 permits the selection of two speed ranges for the threshing cylinder, infinitely variable speed selection within either one of those ranges is afforded by training the belt 47 from the variable diameter drive pulley about an adjustable diameter pulley 85 that is mounted on that portion of the stub shaft 75 outside of the housing 74. The adjustable pulley 85 is of the conventional type and includes two opposed portions 86 and 87 urged together by a spring 88 so that the effective diameter of the pulley 85 can change in accordance with the changes made in the diameter of the drive pulley.

For adjusting the tension of the belt 47 so as to maintain proper operation of the pulleys, the entire housing 74 is rotatably mounted on the wall portion 71 so as to be rotatable about an axis which coincides with the axis of the drive shaft 70. To this end, the housing 74 is generally circular and is fitted in a circular track 91 formed in the wall portion 71 (see particularly FIG. 4). The housing 74 is held in the track 91 by a plurality of clamps 92 which are seamed in place by cap screws 93. It can thus be seen that by loosening the cap screws 93, the pressure of the clamps 92 against the housing 74 is released and the entire housing can be rotated upon an axis which coincides with the axis of the drive shaft 70 so as to swing the stub shaft 75 and thus the pulley 85 toward or away from the pulley 46. In this manner, the tension of the belt 47 can be properly established. Since the axis of rotation for the housing 74 coincides with the axis of the cylinder shaft 70, and since the stub shaft 75 is journalled on an axis parallel to the axis of the cylinder shaft, rotation of the housing 74 does not affect the meshing engagement of the axially shiftable pinion 76 with the ring gear 72 or the engagement of the idler gear 81 with the pinion gear 73.

For rotating the housing 74 the exact amount desired and holding the housing in that position, an adjusting rod 95 is anchored to the combine frame 11 and is passed through a lug 97 formed on the housing 74. A pair of adjusting nuts 98, 99 are fitted on the rod 95 on either side of the lug 97 so that, once the clamps 92 are loosened, rotation of the nuts 98, 99 will rotate the housing 74 and hold it in adjusted position. When the desired position of the housing 74 is established, the cap screws 93 are again tightened so that the clamps 92 will assist in holding the parts in their proper relationships.

We claim as our invention:

1. A drive for a combine component comprising, in combination, a combine wall, a component drive shaft journalled in said wall, a housing surrounding one end of said drive shaft and being mounted on said wall for rotation about an axis coinciding with the axis of said drive shaft, means for securing said housing in adjusted position about its axis of rotation, a stub shaft journalled in said housing parallel to but spaced from the axis of said drive shaft, means including a pair of gears of differing pitch diameters fixed together in spaced planes and a shiftable pinion adapted to selectively engage said gears for establishing alternate rotatable driving connections between said stub shaft and said drive shaft, and a belt driven pulley secured to said stub shaft outside of said housing.

2. A speed controlling drive for a combine component comprising, in combination, a combine wall, a component drive shaft journalled in said wall, an internal ring gear and a pinion of differing pitch diameters secured to one end of said drive shaft, said ring gear and said pinion being disposed in spaced planes, a housing surrounding said ring gear and pinion, said housing being mounted on said wall for rotation about an axis coinciding with the axis of said drive shaft, means for securing said housing in adjusted position about its axis of rotation, a stub shaft journalled in said housing parallel to but spaced from the axis of said drive shaft, said stub shaft carrying an axially shiftable pinion movable into either one of two positions, means including said shiftable pinion for establishing a rotatable driving connection between said stub shaft and said ring gear when the shiftable pinion is in one of its said positions and between said stub shaft and said drive shaft pinion when the shiftable pinion is in the other of its said positions, and a belt driven variable speed pulley secured to said stub shaft outside of said housing.

References Cited by the Examiner

UNITED STATES PATENTS

| | | | |
|---|---|---|---|
| 2,142,730 | 1/39 | Kohl | 74—191 |
| 2,144,028 | 1/39 | Pilkington | 74—242.15 |
| 2,186,290 | 1/40 | Gordon et al. | 74—242.15 |
| 2,491,745 | 12/49 | Locke. | |
| 2,818,740 | 1/58 | Wuertz | 74—191 |

DON A. WAITE, *Primary Examiner.*